(12) United States Patent
Zehler

(10) Patent No.: US 8,467,990 B2
(45) Date of Patent: Jun. 18, 2013

(54) METHOD FOR SETTING THE GEOLOCATION OF A NON-GPS ENABLED DEVICE

(75) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 306 days.

(21) Appl. No.: 13/008,364

(22) Filed: Jan. 18, 2011

(65) Prior Publication Data

US 2012/0185206 A1    Jul. 19, 2012

(51) Int. Cl.
*G06F 19/00* (2011.01)
(52) U.S. Cl.
USPC .......................................................... 702/150
(58) Field of Classification Search
CPC ............................................. G06F 2221/2111
USPC .......................................................... 702/150
See application file for complete search history.

(56) References Cited

U.S. PATENT DOCUMENTS

| 5,848,373 A * | 12/1998 | DeLorme et al. ............. 701/455 |
| 2009/0043504 A1* | 2/2009 | Bandyopadhyay et al. .. 701/213 |
| 2010/0104174 A1* | 4/2010 | Rohlf et al. ................... 382/154 |

* cited by examiner

*Primary Examiner* — Bryan Bui
(74) *Attorney, Agent, or Firm* — Fay Sharpe LLP

(57) ABSTRACT

A method and device for setting a geolocation of a non-GPS enabled device utilizes GPS mapping technology to allow a user to select and set an exact location for a given device within a facility. The method can include obtaining a GPS map of the site where the device is deployed, obtaining a site map of the site, determining the GPS coordinates of at least one of the corners of the site map, overlaying the site map on the GPS map, aligning the at least one corner of the site map with corresponding GPS coordinates on the GPS map, calculating a grid covering the site map, selecting a location on the site map corresponding to the position of the device, and determining the geolocation of the device by calculating the latitude and longitude of said position.

12 Claims, 3 Drawing Sheets

METHOD FOR SETTING THE GEOLOCATION OF A NON-GPS ENABLED DEVICE

BACKGROUND

In large facilities, such as office complexes, the ability to physically locate network devices such as printers, scanners, copiers etc. is useful but can be a challenge. For example, in a facility having multiple floors and multiple wings, there may be dozens or even hundreds of machines scattered throughout the facility. One primitive attempt to provide device location information has been to name each device with a location descriptive name such as "NW Printer 3", which may correspond to a printer located in a northwest location of the facility on the $3^{rd}$ floor. While this approach may work for facilities that are smaller or have a relatively small number of devices, the approach is not generally useful in larger facilities since there may be many devices located in a given location and the ability to describe the location of each device is somewhat limited by the length of a device name. Moreover, the approach requires a user to know the orientation of the facility so as to be able to locate the northwest portion. In very large facilities this can be cumbersome.

A more recent approach has been to set the geolocation of a device by using network infrastructure. For example, if a device is connected to a certain network hub known to be located in a northwest portion of a facility on the $3^{rd}$ floor, such information can be used generally to locate the device. Such approach, however, is not generally very accurate and still results in some ambiguity since multiple devices (e.g., multiple printers) may be connected to a network hub, and differentiating between the multiple devices is not easily done.

Another approach has been to set a device's geolocation by proximity to a GPS enabled device. This approach is not always useful due to limitations of GPS technology. Specifically, typical GPS devices need a clear view of the sky in order to accurately obtain a position. For devices located indoors away from windows, this can present a problem since it may not be possible to obtain an accurate GPS location.

BRIEF DESCRIPTION

The present disclosure sets forth a method of setting a geolocation of a non-GPS enabled device utilizing GPS mapping technology to allow a user to select and set an exact location for a given device within a facility. More specifically, the method includes obtaining a GPS map of the site where the device is deployed, obtaining a site map of the site, determining the GPS coordinates of at least one of the corners of the site map, overlaying the site map on the GPS map, aligning the at least one corner of the site map with corresponding GPS coordinates on the GPS map, calculating a grid covering the site map, selecting a location on the site map corresponding to the position of the device, and determining the geolocation of the device by calculating the latitude and longitude of said position.

The method can further include determining an altitude of the device by accessing a database having elevation information cross-referenced to GPS coordinates, and adding a height value to an elevation corresponding to the geolocation of the device. The height value can be based on a floor number on which the device is located multiplied by a constant value. The step of obtaining a GPS map can include accessing an internet database containing the GPS map. The step of obtaining a site map can include obtaining a floor plan of a facility.

The step of calculating a grid covering the site map can include calculating a grid of GPS coordinates based on the GPS coordinates of the at least one corner.

In accordance with another aspect of the disclosure, a computer-readable medium having stored thereon computer-executable instructions for setting the geolocation of a non-GPS enabled device, the instructions being executable by a processor and comprise obtaining a GPS map of the site where the device is deployed, obtaining a site map of the site, determining the GPS coordinates of at least one of the corners of the site map, overlaying the site map on the GPS map, aligning the at least one corner of the site map with corresponding GPS coordinates on the GPS map, calculating a grid covering the site map, selecting a location on the site map corresponding to the position of the device, and determining the geolocation of the device by calculating the latitude and longitude of said position.

The instructions can further include determining an altitude of the device by accessing a database having elevation information cross-referenced to GPS coordinates, and adding a height value to an elevation corresponding to the geolocation of the device and can include basing the height value on a floor number on which the device is located multiplied by a constant value. The step of obtaining a GPS map can include accessing an internet database containing the GPS map. The step of obtaining a site map can include obtaining a floor plan of a facility. The step of calculating a grid covering the site map can include calculating a grid of GPS coordinates based on the GPS coordinates of the at least one corner.

DETAILED DESCRIPTION

Figure 1:
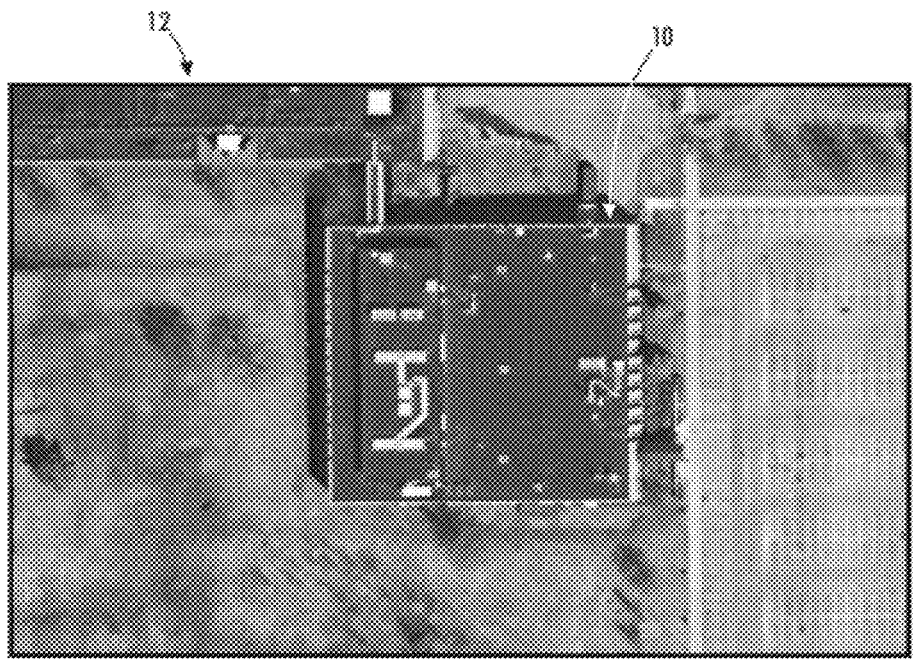
FIG. 1 is an illustration of an exemplary GPS map of a site where a device is deployed in accordance with an embodiment of the disclosure.

Turning now to the drawings, and initially to FIG. 1, aspects of the present disclosure will now be described in detail. In FIG. 1, an overhead view of a building 10 is shown on a GPS map 12. The building 10 may be a typical office building or other facility having one or more office machines or other devices located therein. As will be appreciated, the building 10 can be a multi-story building having floors both above and below grade.

This overhead view of the building site where a device is deployed can be obtained from readily accessible internet sources, such as one of the several online map websites. For example, the address of the building 10 where the device is deployed can be entered into a website to obtain the GPS map 12. The data available from such websites generally may include a map and/or satellite image of the site, including GPS data. Other possible ways to obtain a GPS map of a website include via mapping software or other geographical information systems (GIS) and/or obtaining a physical map of the building site.

Once the GPS map 12 of the site where a device is deployed is obtained, a site map 20 (see FIG. 4) of the site can be obtained. As will be appreciated, these steps can be performed in any desired order (e.g., the site map 20 may be obtained before, after, or at the same time as the GPS map 12). The site map 20 will generally include information about the layout of the site where the device is deployed. For example, a blueprint drawing of a floor of the facility where the device is deployed could be used as a site map. Alternatively, a user may sketch a simple diagram illustrating rooms and hallways, etc. of a facility.

Preferably, the site map 20 will contain sufficient detail to enable a position of a device deployed within the facility to be identified with enough precision to facilitate readily locating said device. As an example, a site map that just contains an outline of the facility (e.g., the exterior walls) in many cases would not be sufficient, whereas an architectural blueprint of the facility that includes the locations of exterior and interior walls, doors, windows, etc. would likely be more than sufficient.

Figure 2:
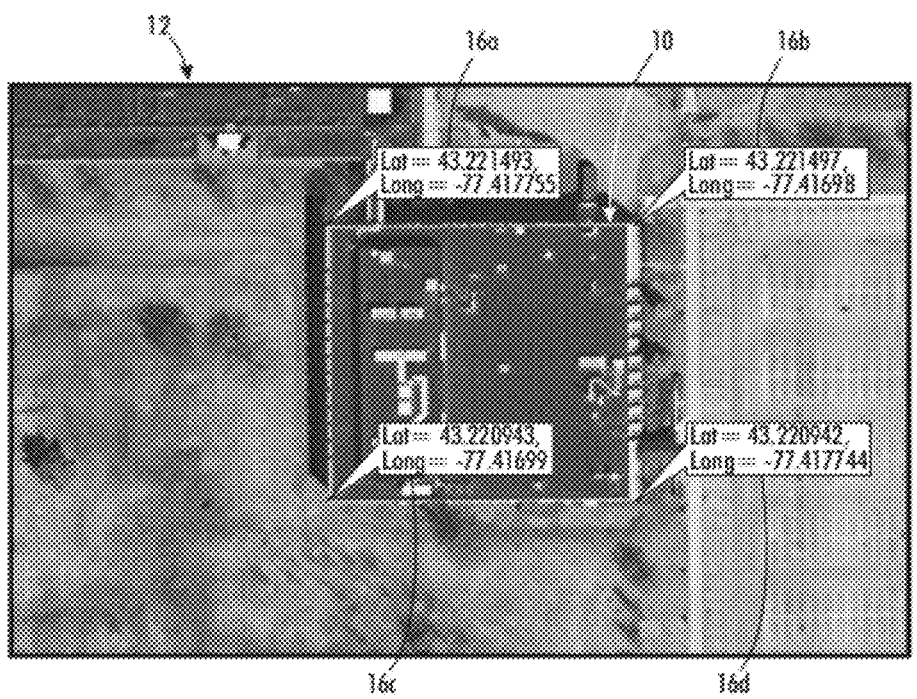
FIG. 2 is an illustration of the GPS map of FIG. 1 with the GPS coordinates of the corners of site indicated.

Turning to FIG. 2, once both the GPS map 12 and the site map 20 are obtained, the GPS coordinates of the corners 16*a*, 16*b*, 16*c* and 16*d* (or other reference points) of the facility are determined. This can be done either directly by using a GPS enabled device and physically obtaining the GPS coordinates of one or more reference points of the building 10. Alternatively, the GPS map 12 can be utilized for approximating the GPS coordinates of reference points of the building 10. Again, the order in which these steps are carried out can vary.

Figure 3:
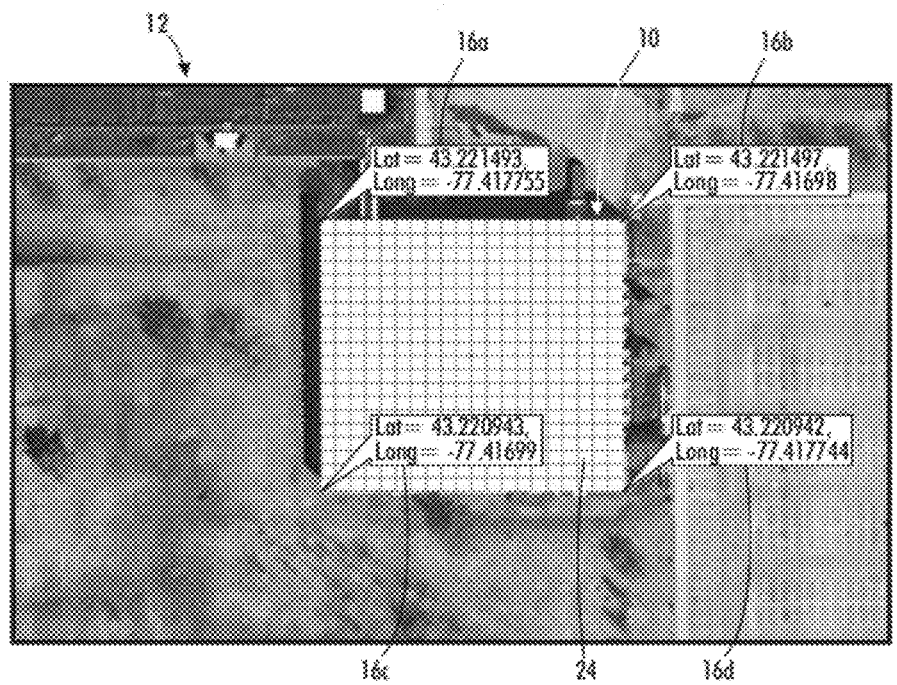
FIG. 3 is an illustration of the GPS map of FIG. 1 having a grid overlayed on the site.

In FIG. 3, once the GPS and site maps are obtained, and the GPS coordinates of reference points of the building are determined, a latitude and longitude grid 24 can be calculated covering the site map based on the determined coordinates of the various reference points of the building (e.g. the corners), if necessary. The grid 24 can be calculated, for example, by dividing the difference in latitude and longitude of the various reference points into equal portions (e.g., second of latitude/longitude).

Figure 4:
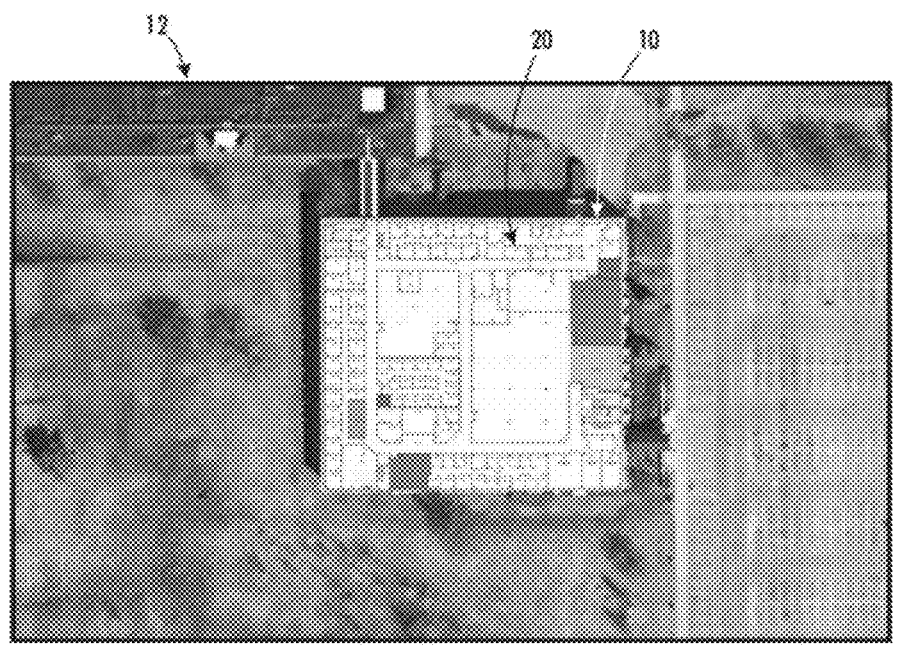
FIG. 4 is an illustration of the GPS map of FIG. 1 having a site map overlayed on the site.

The site map 20 can then be overlayed on the GPS map 12 with the reference points of the building 10 aligned with the GPS coordinates determined, as shown in FIG. 4. For example, the corners 16*a*-16*d* of the building 10 of the site map 20 would be aligned with the corners of the building 10 as identified on the GPS map 12. In some instances, as with satellite photographs overlayed on a GPS map 12, it may be possible to simply overlay a site map 20 on the image of the building 10 without necessarily directly determining the GPS coordinates of one or more reference points of the building 10.

Figure 5:
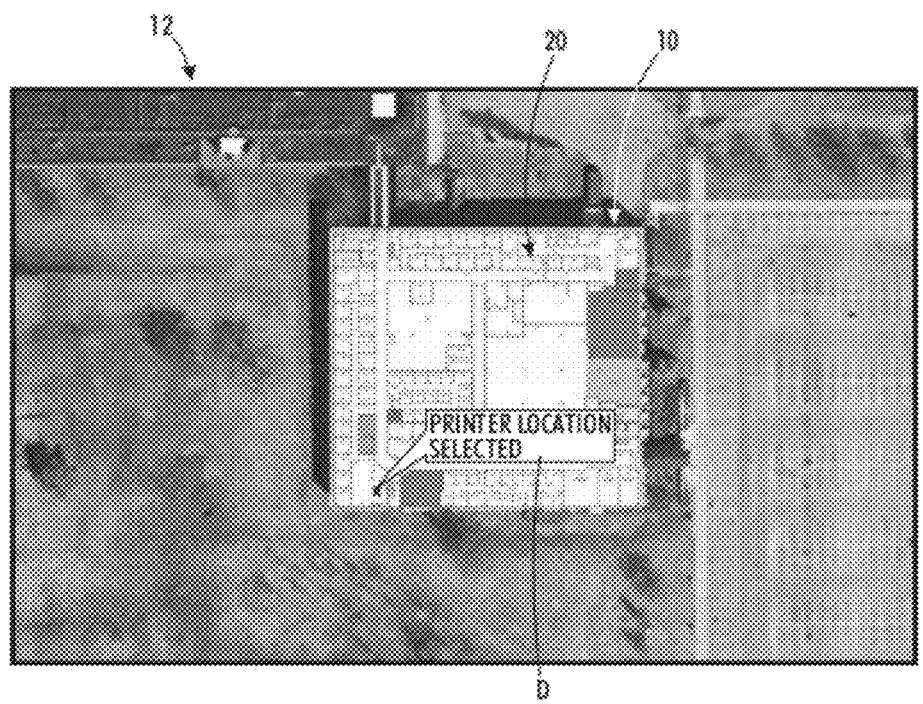
FIG. 5 is an illustration of the GPS map with the geolocation of the device indicated.

Turning to FIG. 5, once the site map 20 and GPS map 12 are aligned, a user can then select a location on the site map 20 corresponding to the position within the building 10 a given device D is deployed. Using the grid, the GPS coordinates of the selected location can then be calculated or otherwise determined and assigned to the device D.

In some applications it may be desirable or necessary to determine an elevation of the device. One way to do this is to have the user provide the floor number on which the device is deployed, and then access a database containing elevation information for the GPS coordinates of the selected position. The floor number times a constant can be added to the site elevation to determine the altitude of the device.

The aforementioned method can be carried out manually, but more likely will be implemented by an application executed by a computer. For example, each device deployed in a facility can be equipped with a user interface through which a user can select the position of the device in the manner previously described. Alternatively, a device such as a cell phone or laptop could be equipped to run an application adapted to carryout the above-described method.

Figure 6:
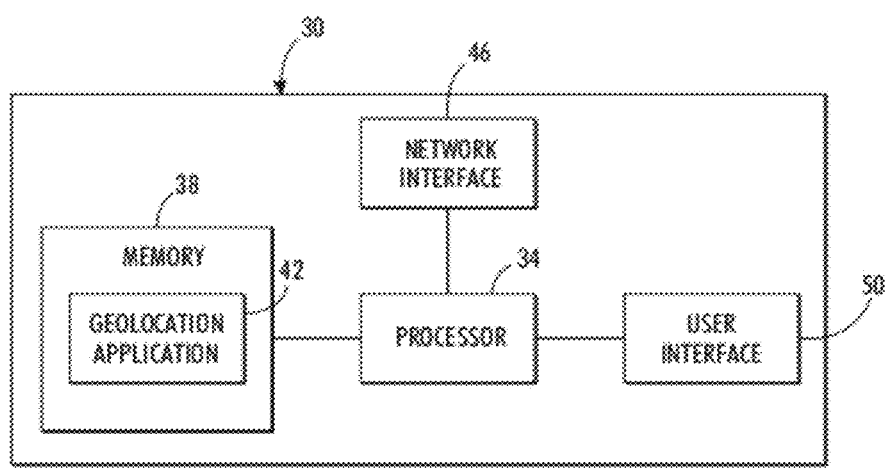
FIG. 6 is a schematic block diagram of a system for setting the geolocation of a non-GPS enabled device.

In FIG. 6, an exemplary system for setting the geolocation of a non-gps enabled device is illustrated and identified generally by reference numeral 30. The system 30 includes a processor 34 and a memory 38. A geolocation application 42 adapted to carryout the method described above is stored in memory 38 for execution by the processor 34. A network interface 46 connects the system 30 to a network for accessing information such as GPS information and/or site map information etc. For example, the network interface can facilitate a connection to the internet for downloading any information needed by the application from one or more servers. A user interface 50 is provided for enabling a user to, among other things, input data to the system 30 for setting the geolocation of the device including selecting the location of the device on the site map (such as, for example, as shown in FIG. 5).

As will be appreciated, the system 30 can be embodied in a wide variety of devices. For example, each office machine or the like could include the system 30. Alternatively, the system 30 could be remote from the office machine and configured to set the geolocation of the device from its remote position. Examples of remote devices that could include the system 30 are network administrator computers, laptops, handheld devices such as cell phones, etc.

Once the geolocation of a device is determined, the type of device (e.g., make and model) being deployed can be translated to an appropriate size for the device. For example, the system can explicitly query the user for the size of the device, or a database of known devices and their associated sizes could be used. The size is a property of a make and model of a printer. It is not a property of the printer's current location.

The application can also calculate an appropriate margin of error for the determined location. The margin of error is usually an intrinsic attribute of the GPS map and the resolution of the UI. The application would most typically use a constant or modify that constant based on how the image is scaled in the user interface.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for setting the geolocation of a non-GPS enabled device comprising the steps of:

obtaining a GPS map of the site where the device is deployed;

obtaining a site map of the site;

determining the GPS coordinates of at least one of the corners of the site map;

overlaying the site map on the GPS map;

aligning the at least one corner of the site map with corresponding GPS coordinates on the GPS map;

calculating a grid covering the site map; and selecting a location on the site map corresponding to the position of the device; and determining, via a processor, the geolocation of the device by calculating the latitude and longitude of said position.

2. A method as set forth in claim 1, further comprising determining an altitude of the device by accessing a database having elevation information cross-referenced to GPS coordinates, and adding a height value to an elevation corresponding to the geolocation of the device.

3. A method as set forth in claim 2, wherein the height value is based on a floor number on which the device is located multiplied by a constant value.

4. A method as set forth in claim 1, wherein the step of obtaining a GPS map includes accessing an internet database containing the GPS map.

5. A method as set forth in claim 1, wherein the step of obtaining a site map includes obtaining a floor plan of a facility.

6. A method as set forth in claim 1, wherein the step of calculating a grid covering the site map includes calculating a grid of GPS coordinates based on the GPS coordinates of the at least one corner.

7. A non-transitory computer-readable medium having stored thereon computer-executable instructions for setting the geolocation of a non-GPS enabled device, the instructions being executable by a processor and comprising:
- obtaining a GPS map of the site where the device is deployed;
- obtaining a site map of the site;
- determining the GPS coordinates of at least one of the corners of the site map;
- overlaying the site map on the GPS map;
- aligning the at least one corner of the site map with corresponding GPS coordinates on the GPS map;
- calculating a grid covering the site map; and
- selecting a location on the site map corresponding to the position of the device; and
- determining the geolocation of the device by calculating the latitude and longitude of said position.

8. A non-transitory computer-readable medium as set forth in claim 7 having stored thereon computer-executable instructions for setting the geolocation of a non-GPS enabled device, the instructions being executable by a processor and further comprising determining an altitude of the device by accessing a database having elevation information cross-referenced to GPS coordinates, and adding a height value to an elevation corresponding to the geolocation of the device.

9. A non-transitory computer-readable medium as set forth in claim 8 having stored thereon computer-executable instructions for setting the geolocation of a non-GPS enabled device, the instructions being executable by a processor and further comprising basing the height value on a floor number on which the device is located multiplied by a constant value.

10. A non-transitory computer-readable medium as set forth in claim 7 having stored thereon computer-executable instructions for setting the geolocation of a non-GPS enabled device, the instructions being executable by a processor, wherein the step of obtaining a GPS map includes accessing an internet database containing the GPS map.

11. A non-transitory computer-readable medium as set forth in claim 7 having stored thereon computer-executable instructions for setting the geolocation of a non-GPS enabled device, the instructions being executable by a processor wherein the step of obtaining a site map includes obtaining a floor plan of a facility.

12. A non-transitory computer-readable medium as set forth in claim 7 having stored thereon computer-executable instructions for setting the geolocation of a non-GPS enabled device, the instructions being executable by a processor wherein the step of calculating a grid covering the site map includes calculating a grid of GPS coordinates based on the GPS coordinates of the at least one corner.

* * * * *